Figures 1, 2, 3:
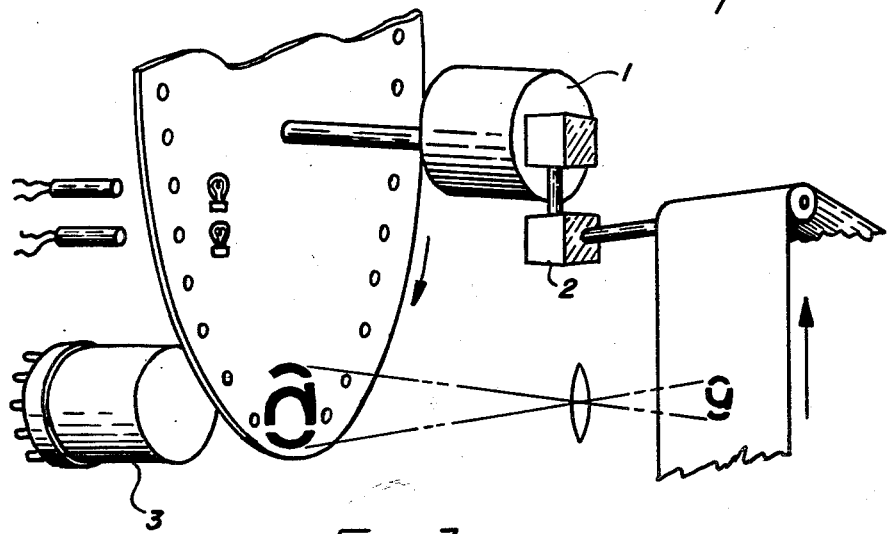

June 8, 1965  J. RABINOW ETAL  3,188,610
MACHINE READABLE CHARACTERS AND PROCESS
OF TRANSLATING CHARACTERS
Filed June 15, 1959  4 Sheets-Sheet 1

01234
56789

01239A

Inventors
JACOB RABINOW
ARTHUR W. HOLT

By Max L. Libman

Attorney

June 8, 1965  J. RABINOW ET AL  3,188,610
MACHINE READABLE CHARACTERS AND PROCESS
OF TRANSLATING CHARACTERS Filed June 15, 1959  4 Sheets-Sheet 2

Inventors
JACOB RABINOW
ARTHUR W. HOLT

By Max L. Libman
Attorney

INVENTORS
JACOB RABINOW
BY ARTHUR W. HOLT
Max L. Libman
ATTORNEY

INVENTORS
JACOB RABINOW
ARTHUR W. HOLT
BY Murr L. Libmon

ATTORNEY

United States Patent Office 3,188,610
Patented June 8, 1965

3,188,610
MACHINE READABLE CHARACTERS AND PROCESS OF TRANSLATING CHARACTERS
Jacob Rabinow, Takoma Park, and Arthur W. Holt, Silver Spring, Md., assignors, by mesne assignments, to Control Data Corporation, Minneapolis, Minn., a corporation of Minnesota
Filed June 15, 1959, Ser. No. 820,262
5 Claims. (Cl. 340—146.3)

This invention relates to a design of a printed font specially suited to be read easily both by humans and by machines and to machines for reading each character. The characters are of the composite type which may be considered essentially a set of marks as far as machines are concerned, and conventional type as far as the human is concerned.

In many operations of industry and government, documents must be imprinted with alphabetic characters and numerals in such a manner that they can be read both by machines and by humans. This is particularly true of documents such as checks, money orders, credit slips, receipts, shipping tickets, the paper tapes produced by adding machines and cash registers, etc. Many of these documents return to the issuing organization or to their agents and are, for that reason, called turn-around documents. Such turn-around documents, must, at some stage in their existence pass through and be read by humans and must be, therefore, readable without specialized equipment.

Many attempts to solve this problem have been made. One involves the use of character recognition machines capable of reading ordinary characters. Another involves the use of double systems where the human reads the ordinary character and the machine reads either perforations in the paper or special marks in the vicinity of the character. Use of punched cards is well known and will not be touched upon here, but some comment must be made about the so-called "double-printing" of characters and marks. This requires special equipment since the space alloted to the usual character is not adequate for printing both, and certainly much of the present day equipment for typing and printing can not be easily converted to this double font.

There have also been a few attempts to so distort the characters that simple machines can recognize the characters as essentially a set of coded marks.

The various systems heretofore proposed all have disadvantages which have kept them from being accepted as a solution to the problem. Among other things, many of these systems suffer from the difficulty that very exact registry must be obtained by the character and the mark sensing areas. This, in practice, is nearly impossible, particularly where high speed reading is required. In other proposed systems, the marks of which the characters are composed can be read at high speeds, but the marks suffer from too fine a division of the character so that if the character is printed with ordinary rubber type or through an inked ribbon, the lines will not be resolvable and the signal-to-noise ratio will be too low. Also, the number of modulations required to define a complete alpha-numeric system would be impossible with any ordinary printing.

To overcome the difficulties formerly encountered, we have invented a new type font and the machinery to read it. Essentially, the font is characterized by having characters with small sections missing so that a scanning device can see the font as a code, while to the human observer the characters appear reasonably normal.

Figure 4:
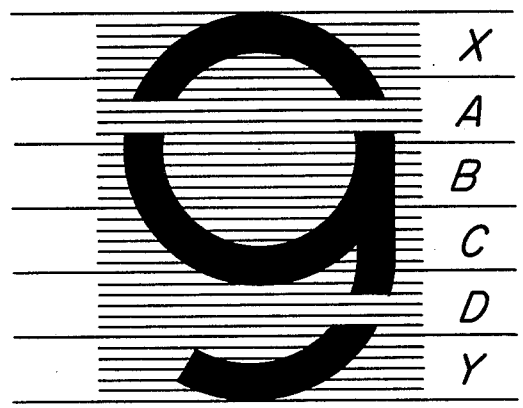
Figure 5:
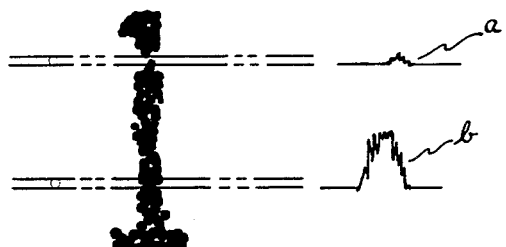
Figure 6:
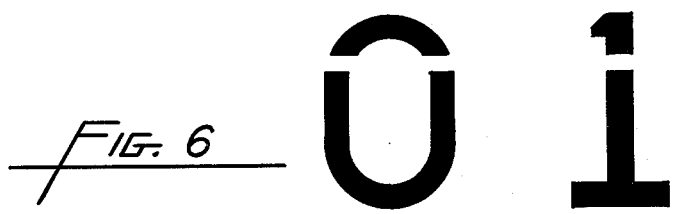
Figure 7:
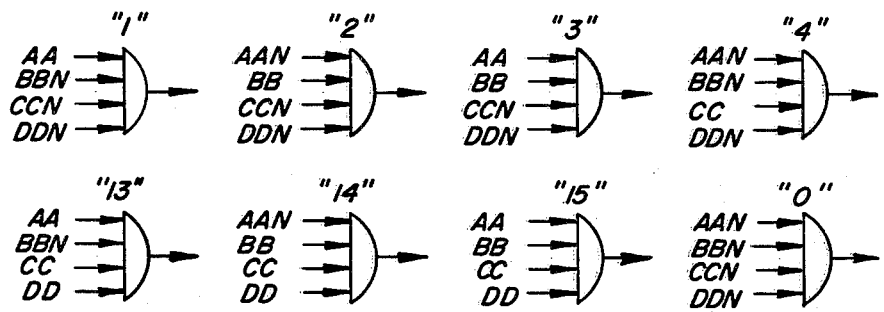
Figure 8:
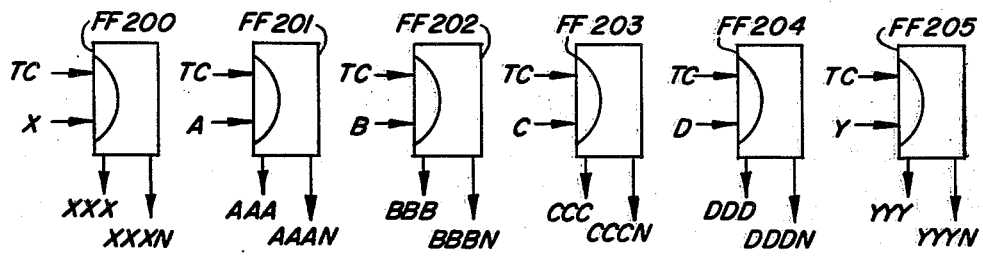
Figure 9:
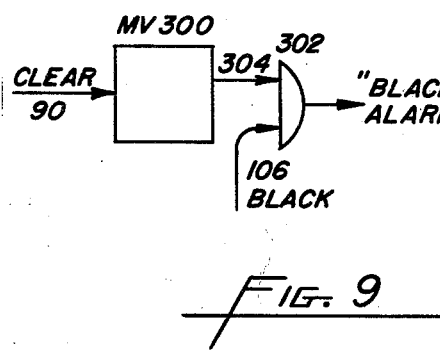
Figure 10:
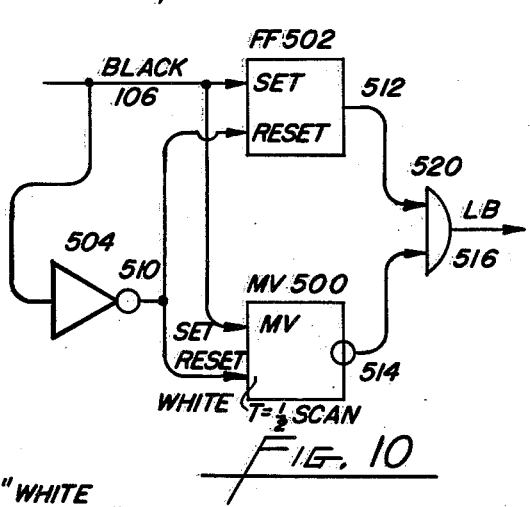
Figure 11:
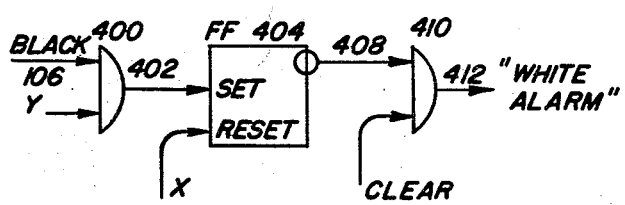
Figure 12:
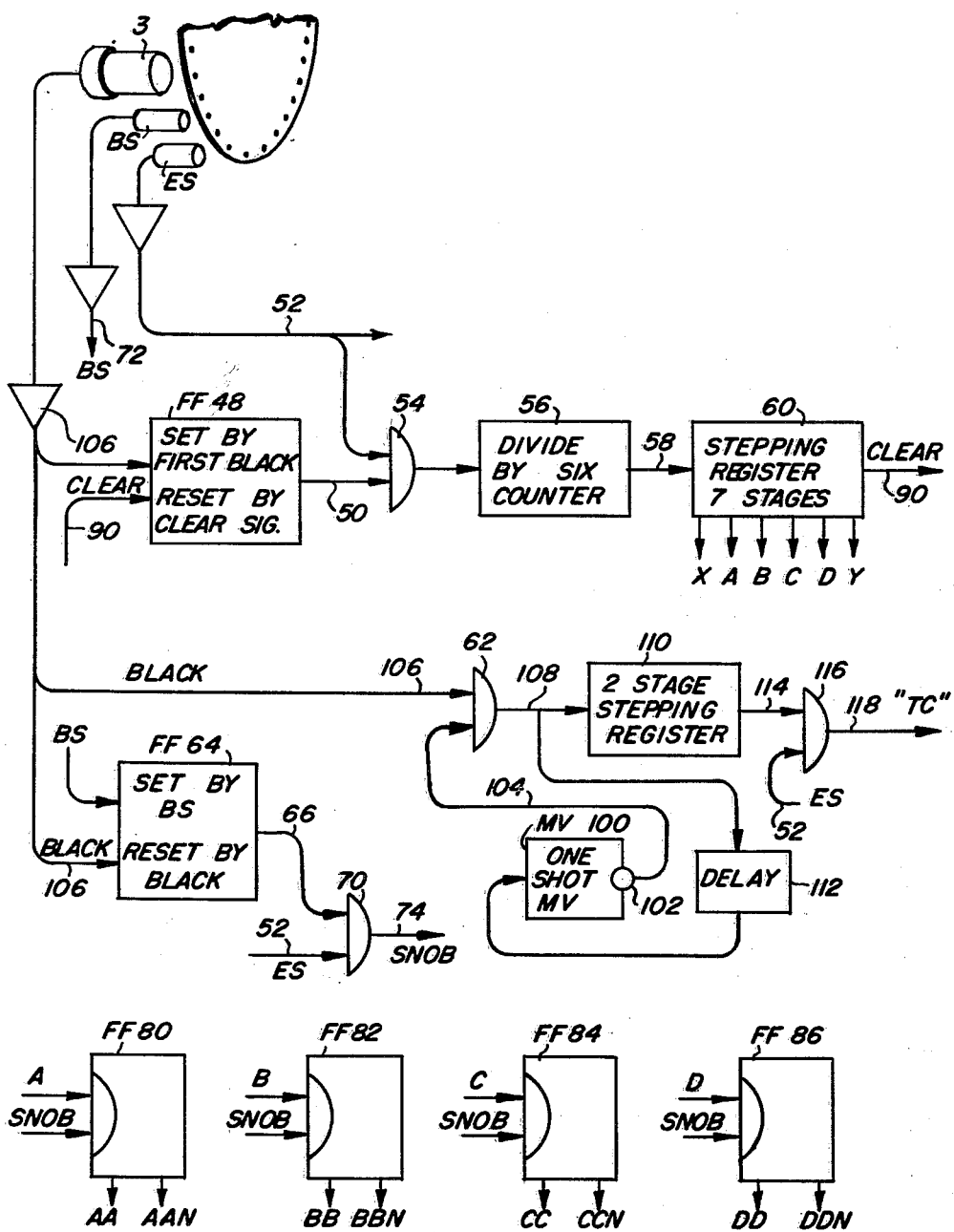

The specific nature of our invention, as well as other objects and advantages thereof, will clearly appear from a description of a preferred embodiment as shown in the accompanying drawings, in which:

FIG. 1 shows a set of characters according to the invention, cut along the horizontal dimension;
FIG. 2 shows a set of characters cut along the vertical dimension;
FIG. 3 is a schematic drawing showing the general arrangement of a suitable scanning mechanism for reading the font of FIG. 1;
FIG. 4 shows the lines of scan as referred to a character such as the numeral "9";
FIG. 5 shows the type of signals produced in scanning a fuzzy letter;
FIG. 6 shows how two different characters can be distinguished even though the same cut is used to identify them;
FIG. 7 illustrates the scheme for a character identification matrix composed of AND gates;
FIG. 8 illustrates the scheme for a character identification matrix using the number of crossings a scan makes;
FIG. 9 shows the "black alarm" signal circuit for indicating inadequate spacing between letters;
FIG. 10 shows the "long black" signal circuit for indicating the scanning of a "long" black line;
FIG. 11 shows the "white alarm" signal circuit for indicating the presence of an incompletely printed letter; and
FIG. 12 shows the basic circuit arrangement for identifying characters.

Referring to FIG. 3, we show a printed character on a paper tape such as might be produced in an adding machine or in a cash register. In such machines the characters are normally arranged in short horizontal lines. It is necessary in many business operations to transcribe this information into a computer, for example, to produce totals and sub-totals from this data. The paper in this application would normally be moved vertically in reference to the characters as shown by the arrow in FIG. 3. For the sake of simplicity, we show a revolving disc scanner, although it should be clearly understood that other scanning mechanisms such as image dissecters and flying spot scanners can also be employed. As the paper moves vertically, the image of the character will be traversed by the holes in the disc as shown in FIG. 3. While each scanning hole will, in reality, describe an arc during the single scan, by making the disc large enough this path can be considered as a straight line for the short distance involved, and we therefore show the scans as straight lines. By using a horizontal fixed slot ahead of the disc and radial slots in the disc, true straight line scanning can be obtained, but for the sake of simplicity, this construction is not shown. The drive for the paper and the scanning disc are shown in FIG. 3 as being done by a common motor 1 driving the paper through a suitable reduction gear box 2. This is one method of assuring that each character will be scanned by the correct number of lines. Separate motor means can, of course, be used if their speeds and associated mechanisms are correctly proportioned.

It will therefore be seen that as the paper moves vertically, the photocell will see the output of the scanning disc. First the output will be that of white paper without any interruption during each scan cycle and this "clear white" signal can be utilized in the electronic part of our machine to indicate that the scanned area is between characters. As the characters move upwards, the scanning lines will traverse each character horizontally and produce signals which we employ for recognition.

When the character is scanned by horizontal lines certain sections of some characters are crossed more than once by the scanning hole; as, for example, in many parts of the numeral "9". This enables us to extract more information from the scanning system than merely the fact that it does or does not cross a black line. Thus, by using two shift registers and loading them not merely with the information that a scanned line crosses black or white, but also whether black is crossed once or twice, we can recognize more characters than without this feature. For example, the characters "0" and "1" have a single cut as shown in FIG. 6. They can be distinguished from each other by the fact that the "0" is crossed at two points in several places, while the "1" is crossed only once. We can also treat long black signals, such as the bottom of the character "1" as a double crossing by using the system described below.

It should be understood that when we speak of white and black, these are merely relative terms and that, in practice, the paper is never perfectly reflective and the character is never perfectly absorptive of the light. Various expedients of automatic gain control and quantizing of the black are well known to the art and are not part of this application. The signal levels that determine which scanned points are called "black" and which are called "white" can be changed to suit the nature of the printing techniques.

While we often show "clean" signals (which must have been the result of scanning crisply defined black and white), in practice this is not often the case. The black may be grey and ragged, and the white may be quite "dirty." The output of a scan going through such a "white" would look something like that shown in FIG. 5, at *a*, while the output of an imperfect "black" would look something like that shown in FIG. 5, at *b*. By passing the output of the photo circuit through the integrating circuit and then setting the quantizing level at some suitable value (approximately halfway between "ragged black" and "dirty white"), the two can be differentiated from each other and the system can work with characters of relatively low quality.

FIG. 12 shows the general schematic diagram of an electronic equipment which can be used to convert the output of the photocells into the recognition signals. The symbols are conventional in the computer art and will be defined as the description proceeds. Typical circuits for accomplishing the functions of the symbols can be found, for example, in texts such as: R. K. Richards, "Digital Computer Components and Circuits," D. Van Nostrand Co.; National Bureau of Standards Circular 551: "Computer Development at NBS," particularly FIG. 4.2, p. 76, "Fundamental Elements for Computer Systems."

In addition to the information photocell 3 behind the scanning disc, we provide two additional photocells, "BS" and "ES," so placed that one receives a light at the beginning of a scan and the other receives light just at the end of scan. These photocells put out a signal which we call respectively "beginning of scan" or "BS" and "end of scan" or "ES." The output of the information photocell 3 is amplified by amplifier 106 which also comprises an integrating and quantizing circuit so arranged that presence of sufficient black in a character element produces a "black" signal. The paper background produces no signal.

The outputs of the "ES" and "BS" cells produce signals as stated at the appropriate instant in each scan. Suitable amplifiers are provided for this purpose which feed lines 52 and 72, respectively. As the character to be read moves into position, the first "black" signal will be fed to flip-flop 48 which will be triggered by this signal and produces an output on line 50. The end of that same scan produces a signal on line 52. The AND gate 54 will pass both signals through into the counter 56. Thus begins the recognition cycle. Until the end of the character recognition the flip-flop 48 will stay set and there will be a continuous signal on line 50.

As soon as the recognition cycle begins, the counter 56 starts counting scans. At the end of each six scans, an output pulse will appear on line 58. This pulse is fed into the seven stage stepping register 60. This register can be considered, for example, as seven flip-flops in sequence so arranged that a pulse travels down the register. Thus, if we start with a line X energized, every time a pulse arrives on line 58, the next line at the bottom of the register will be energized. After the first pulse, line X becomes "dead" and line A becomes energized; when the second pulse is received, line B becomes energized; when the third pulse is received, line C; on the fourth pulse, line D; fifth pulse, line Y; and on the sixth pulse, the "clear" line is energized together with the line X again. Since line 58 is energized every six scans, the seven-stage register will count 36 scans for a complete cycle. At the end of 36 scans, the stepping register 60 is arranged to emit a short CLEAR signal on line 90, reset itself to its initial condition, and energize line X again.

Let us go back now to the scanning of the numeral "9" as shown in FIG. 4. It will be seen that during the first six scans we are receiving black signals at least once during each scan. These signals are sent to FF 48, to AND gate 62 and to FF 64. The circuit for recognizing a completely white scan begins with FF 64. The BS signal is also fed to FF 64, which is so arranged that the beginning of scan "sets" FF 64 so as to produce a signal on line 66. Thus at the beginning of each scan, line 66 is energized and would remain energized for the whole scan if no black signal is seen. This is because FF 64 can be reset by any black signal on line 106. Because the first six scans we are discussing produce black signals during each scan, line 66 is dead by the time each scan is finished, and the AND gate 70 passes no signal at the end of each scan. It will be noted that the "end of scan" cycle is fed to this AND gate 70 on line 52. As we continue scanning of the numeral "9" in FIG. 4, the next two scans are also black and still no signal leaves gate 70. However, the line A of the register 60 has by now become energized. Consider now the 9th scan which is the first that has no black. The beginning of scan sets the FF 64, as formerly, energizing line 66. During the whole of the scan, no signal arrives on line 106. Line 66 remains energized, and later, "ES" signal arrives on line 52. AND gate 70 is now effective and energizes line 74 with a signal we call "SNOB" standing for "last scan not black." Scans 10 and 11 in FIG. 4 repeat this action, and line 74 will be energized twice again by the "ES" signals on line 52.

As the scanning of the numeral "9" continues, we shall have outputs on line 74 which indicate whether we had a "white" or a "black" line, while the outputs of lines A, B, C, and D (from register 60) will indicate in which areas of the character these "white" lines occur. Since we would like to obtain a binary output register corresponding to the scanned areas of A, B, C, and D of FIG. 4, we now provide FF's 80, 82, 84, and 86 for this purpose. FF 80 can be set by a signal on line A and reset by line marked SNOB from the AND gate 70. The positive output of FF 80 is marked AA while the complement of the FF output is marked AAN. This means that when the FF 80 is set, line AA is energized and when FF 80 is reset, line AAN (AA Negative) is energized. Similarly for 82, 84, and 86. At the end of 12 scans of which six are done in the area A of FIG. 4, and while line A of register 60 was energized, the FF 80 was set because line A was energized while signals were arriving on line SNOB. In other words, the FF 80 was set because one or more all white scans occurred in area A.

Similarly, during scanning of the area B of FIG. 4, which has black in every line, the SNOB line will not get energized at any time and FF 82 will remain reset. This means that line BBN will remain energized while line BB will remain dead. This will also be true for FF 84. FF 86, however, corresponds to area D of FIG. 4 which will have white lines, producing signals on line SNOB.

Therefore the output of this FF 86 will have its line DD energized and line DDN will be dead. Therefore, the setting of FF 80–FF 86 gives a binary-coded designation of the character.

At the end of 36 scans the "CLEAR" line 90 will be energized. This line 90 is the reset line for FF 48. When this FF is reset, line 50 becomes dead and further input to the counter 56 ceases. The line X is again energized and will remain thus to the beginning of the scanning of the next character.

As stated earlier, crossing a black line more than once can also produce useful information but to make use of this fact, the circuitry beginning with AND gate 62 is employed. The one-shot multivibrator MV 100 is normally in the reset position and the symbol 102 means that line 104 is normally energized. Thus, when a black signal arrives on line 106 the AND gate 62 will pass a signal to line 108. This black signal will step the register 110 and then insert a "one" into the first stage. At the same time the black pulse enters the delay 112. The delay can be of very short duration, such as a few microseconds. The output of the delay line 112 "sets" the one-shot multivibrator MV 100, thus de-energizing the line 104. The one-shot multivibrator MV 100 is designed to have a time constant approximately equal to 1/4 of a scan time which, in the case of our character, is somewhat longer than the time it takes to cross the thickness of a line of the character. Thus, when a scan crosses a line, one pulse will appear on line 108. Consider, however, what happens if a long line is being scanned such as the bottom of the numeral "1" in FIG. 6. Line 106 will remain energized for a long time. At the very beginning of this black line, 108 will receive a short pulse, as formerly, which will be quickly extinguished by the "setting" of the one-shot multivibrator MV 100. At the end of 1/4 scan time, the one-shot multivibrator resets itself, again re-energizing line 104. Line 106 is still energized. A pulse therefore appears again in line 108, again stepping the two-stage stepping register 110. The "one" previously stored in the first stage now energizes line 114, which feeds the AND gate 116. The "end of scan" signal also is fed to gate 116. At the end of the scan, therefore, a signal appears at the output of gate 116 on line 118. We call this signal "Two Crossings," or "TC."

Let us consider how this circuit operates if and when there are two crossings as, for example, in area B of FIG. 4. A black signal appears on line 106. Line 104 is normally on. A pulse, therefore, appears in line 108 and enters the two-stage register 110. The beginning of this pulse passing through the delay line 112 setting the one-shot multivibrator MV 100, de-energizes line 104 for a time somewhat longer than that necessary to scan a single thickness, as stated formerly. Line 106 goes dead before the one-shot multivibrator resets itself. As the second black signal is received, somewhat later, this whole sequence repeats itself and a two-stage register 110 is actuated twice, producing a signal on line 114. At the end of the scan, "TC" line 118 receives a pulse. Thus it can be seen that we have provided a circuit by which a long black line during any single scan gives the same signal as a double crossing. Incidentally, a triple crossing would have the same effect since the register 110 would put out a signal on two or more crossings.

In a simple form of this invention we can recognize one of 16 characters if we use four possible cuts, either by providing a binary output on lines AA, BB, CC, and DD on which the binary number appears as a combination of signals as described above, or we can have one wire energized for each of the 16 symbols. To do this, we can provide a matrix of 16 AND gates marked "1," "2," "3," etc., some of which are shown in FIG. 7, which are fed by the assertion and complement wires from the FF's 80, 82, 84 and 86. For example, to energize the output line of AND gate "1," it is necessary that the four input lines to this AND gate be all energized. The four lines that are energized if "1" is read are lines AA, BBN, CCN and DDN. This is another way of saying that the four binary digits which represent "1" are converted to a single signal at the output of the gate "1." Inspection of FIG. 7 shows how the binary inputs to some of the possible 16 AND gates are connected to produce a decimal output. It should be noted again that in modern computer techniques this conversion from binary to decimal systems is not necessary and the binary output is normally used directly.

As suggested earlier, in a more sophisticated version of our invention, we can obtain more information from scanning the character than by merely determining whether we have a "black" or a "white" scan. This enables us either to read a small number of characters with more certainty, or to read a greater number of different characters than the number of cuts would normally permit. This is done by recognizing the number of crossings of a character line by each scan and the location of these "double" and long crossings in the sequence of scans. As described above, we obtain a signal for each double line or a long black on line 118, which we call the "TC" signal. At the same time, we obtain signals on lines X, A, B, C, D, and Y as described formerly. We can now combine these signals in a set of six FF's which we call 200, 201, 202, 203, 204, and 205. The FF 200 is set through an AND gate by line TC and line X. Similarly, FF 201 is set by line TC and line A, and so on. This means that if a double crossing occurs, for example, during any scan lines in area B of FIG. 4, FF 202 will be set to its positive state because line B was energized during the six scans of area B and the signal on TC was produced either by a double crossing or a long black scan. The output of FF 202 would therefore have a signal on line marked BBB and line BBBN would be dead.

Thus, at the end of the complete scanning of a character we have ten FF's consisting of 80, 82, 84, 86, and 200, 201, 202, 203, 204, 205 which are either in the set or reset condition. Each flip flop has two output lines, one of which is energized. These outputs, in themselves, designate the nature of the character that was scaned and, being in binary form, can be fed into computers or other suitable equipment; or they can be combined by AND gates similar to those shown in FIG. 7. Each of these AND gates provides a single line output which is a function of the particular signals fed to these ten flip flops. The outputs of ten flipflops can be combined to determine a very large number of characters. Theoretically over one thousand combinations are possible. In practice, with ordinary characters, the number is much smaller. Nevertheless, four cuts and the additional information can easily define the complete alphabet and the ten numerals. All of these ten flipflops can be reset by an external signal coming from utilization devices (such as computers) or by a signal from the "CLEAR" line 90, FIG. 12.

In order to provide some additional safety such as an alarm to indicate that there is not sufficient white space between characters, we provide the circuit of FIG. 9 consisting of the multivibrator 300 which is triggered by the "CLEAR" signal (line 90 of FIG. 12) and which feeds AND gate 302 via line 304. AND gate 302 also receives "BLACK" signals from line 106. The multivibrator is designed to produce a signal, when triggered, whose duration is somewhat shorter than that taken to scan the white space between two successive characters. If any black appears during this time, meaning that there are ambiguous black signals where there should be none, this black signal will occur during the time that line 304 is energized, thus producing a sigal on "BLACK ALARM" wire. This signal can be fed to the utilization equipment and used in any way desired. For example, it can cause the disregarding of the last reading of the character or be used merely to mark the character as being possibly incorrect.

In order to make sure that the character was present in its entirety, we can provide another circuit that indicates that a sufficient number of scans produce black signals. For a character shown in FIG. 4 we should, under ideal conditions, have 36 scans of which the last six produce BLACK, although a number slightly smaller than 36 may be acceptable because the character may be slightly thinner than ideal. However, if the scan has too few black lines, this will indicate a defect, and we provide the WHITE ALARM circuit of FIG. 11. This is done by feeding the BLACK line 106 and the Y line from register 60 (both from FIG. 12) into AND gate 400, as shown in FIG. 11. This AND gate would produce an output on line 402 if any black is seen after 30 scans but not after the 36th scan. This is because line Y becomes energized on the 30th scan and stays energized until the 36th scan. If any black appears on line 106 during that time the AND gate 400 passes this signal and line 402 becomes energized. The flipflop 404 is normally in the reset condition, thus normally energizing line 408. If any "BLACK" signal appear between the 30th and the 36th scans, FF 404 will be set, de-energizing line 408. When the CLEAR pulse arrives at the 36th scan, no signal passes through the AND gate 410 and no "WHITE ALARM" is generated on line 412. If, however, no black was seen during the six scans when line Y was energized (30th to the 36th scan), then FF 404 would not be set and the line 408 would remain energized. The CLEAR signal would then combine with the signal on line 408 and pass through AND gate 410 to produce a "WHITE ALARM." The FF 404 is reset by the signal on line X at the completion of the scan.

While the foregoing description has pertained to a character cut horizontally (FIGS. 1, 4, 5, 6), and the mechanism of FIG. 3 shows the character moving vertically, identical techniques can be used to read characters which move horizontally if the cuts through the characters are made vertically as shown in FIG. 2. Examination of the sample characters in FIG. 2 indicate that many of them give triple crossings when scanned vertically. We can provide circuits which would count three crossings instead of two. This would be a three-stage register similar in design to the two-stage register 110.

The circuit for recognizing long black lines during a single scan can be of the type shown in FIG. 10. The BLACK signal is fed to an amplifier 504 which inverts the signal so that its output energizes the line 510 whenever there is no black. The BLACK signal is also fed to the multivibrator 500, whose time constant can be made approximately equal to one-half of the time of a single scan, or any other magnitude, depending on how long a black line we wish to recognize. MV 500 is normally in the reset condition, energizing line 514. This line 514 is thus kept energized till a BLACK signal appears on line 106, when MV 500 is triggered. This de-energizes line 514. The BLACK signal also sets flipflop 502 and this energizes line 512. No signal passes the AND gate 520 under these conditions. Now assume that the BLACK signal lasts longer than the time constant of MV 500. This multivibrator resets itself at the end of its time constant, energizing line 514. Now a signal is passed through AND gate 520 and appears on line 516 marked "LB," meaning "LONG BLACK." If the BLACK signal did not last long enough to exceed the time constant of MV 500, line 106 would become de-energized, the inverting amplifier 504 puts out a signal on line 510. This signal resets both the FF 502 and the MV 500. Line 514 becomes energized while line 512 goes dead. No signal appears on line 516. The circuit is now ready to receive new signals.

The output of such triple crossings and long blacks can be stored in additional flipflops. This additional information enables us to read more diverse characters with fewer cuts, or to get additional information for a fixed number of cuts, producing more certain reading.

What we have shown here is a relatively simple method of scaning characters where relatively minor modifications of the character enables a scan in the simplest version of the invention to determine the character merely by the presence or absence of black during each scan. This technique minimizes the difficulties with positioning of the character along the line of scan and enables us to produce a simple and inexpensive machine. By the use of additional information produced by counting the crossings of the character by each scan, and by detecting the presence of long black lines, we can read alpha-numeric characters with as few as three cuts through the characters.

It will be recognized that what we have provided is two dimensional scanning system for a character, with single dimensional output except in those cases where the crossings and long blacks are counted. The resolution of the scanning system can be made as high as desired and great sophistication can be employed, if necessary, to determine when the scanning spot is on the line of character or off. The information that is finally presented at the output of the machine is, however, in simple coded form and the exact shape of the font is of little significance. One would normally design the front so that important parts of each character do not coincide with a cut. However, the invention can be readily used with most conventional fonts, and it requires only making a few cuts across the printing type at selected points to adapt most existing type for use with the invention.

While the invention has been shown with a sequential scanning system, it is within the contemplation of the invention to employ a parallel scanning system, which would scan all the lines simultaneously, or a combination of the two, e.g., the six scans of each section shown in FIG. 4 could be made simultaneously, or each section X, A—Y scanned simultaneously six times in succession, in which case the register 60 could be a static register with each stage connected to a separate photocell. This would speed up the operation at the expense of more equipment.

It will be apparent that the embodiments shown are only exemplary and that various modifications can be made in construction and arrangement within the scope of our invention as defined in the appended claims.

We claim:

1. A character reading machine for use with a special font of characters having cuts along certain individual predetermined paths transversely intersecting the character lines to define a positional code identifying the character without impairing the legibility of the font, comprising optical scanning means to traverse the character line by line parallel to said predetermined paths transverse to the character lines, electronic means actuated by said scanning means to produce an indication of the individual predetermined paths at which the character has been cut, other electronic means actuated by said optical means for indicating the number of times the scan crosses a part of the character during each traverse, and output coding means producing a unique code response for each character in accordance with the positional relationship of the cuts and the said number of crossings.

2. A character reading machine for use with a special font of charaters having cuts along certain individual predetermined paths transversely intersecting the character lines to define a positional code identifying the character without impairing the legibility of the font, comprising optical scanning means to traverse the character line by line parallel to said predetermined paths transverse to the character lines, electronic means actuated by said scanning means to produce an indication of the individual predetermined paths at which the character has been cut, other electronic means actuated by said optical means for producing a further indication of the scanning of a part of a character extending substantially all the way along the dimension of the character in the direction of the scan traverse, and output means producing a unique code response for each character in accordance with the positional relationship of the cuts and with said further indication.

3. A character reading machine for use with a special font of characters having cuts along certain individual predetermined paths transversely intersecting the character lines to define a positional code identifying the character without impairing the legibility of the font, comprising optical scanning means to traverse the character line by line parallel to said predetermined paths transverse to the character lines, electronic means actuated by said scanning means to produce an indication of the individual predetermined paths at which the character has been cut, other electronic means actuated by said electronic means for indicating the number of times a scan line crosses a part of the character during each traverse, further electronic means for producing a further indication of the scanning of a part of a character extending substantially all the way along the dimension of the character in the direction of the scan traverse, and output means producing a unique code response for each character in accordance with the positional relationship of the cuts, with said number of crossings, and with said further indication.

4. In a reading machine for a font of printed characters formed of single lines which have transverse gaps forming paths which are irregularly located within the respective characters to define positional codes when coupled with the lines of the characters, the combination of means including an optical scanner providing scan lines which traverse a said character parallel to said transverse gaps and provide first scan information signals corresponding to the crossed lines of the character and second scan information signals corresponding to the paths transverse to the single lines of characters, first electronic means responsive to said first information signals to produce a first indication of one or more paths in the scanned character, second electronic means responsive to said second information signals to produce a second indication of the number of times the scan lines cross the single lines forming the character, and combining means connected with said first and said second electronic means and responsive to said first and said second indications for providing a character-identity output on the basis of the positional relationship of said gaps and the number of crossings of the character lines.

5. The subject matter of claim 4 wherein said means including an optical scanner provide a third scan information signal corresponding to the scanning of a part of the character extending substantially all the way along the length dimension of a single line of the character, third electronic means responsive to said third information signal to produce a third indication of a character line substantially as long as the dimension of the character parallel to the character line, and said combining means also combining said third indication with said first and second indications in providing said character-identity output.

References Cited by the Examiner
UNITED STATES PATENTS

| | | | |
|---|---|---|---|
| 2,616,983 | 11/52 | Zworykin et al. | 340—149 |
| 2,615,992 | 10/52 | Flory et al. | 340—149 |
| 2,784,392 | 3/57 | Chaimowicz | 340—149 |
| 2,932,006 | 4/60 | Glauberman | 340—149 |
| 2,961,649 | 11/60 | Eldredge et al. | |

MALCOLM A. MORRISON, *Primary Examiner.*

E. R. REYNOLDS, JOHN F. BURNS, *Examiners.*